(12) United States Patent
Yu et al.

(10) Patent No.: US 12,391,147 B2
(45) Date of Patent: Aug. 19, 2025

(54) STRUCTURE FOR COOLING A BATTERY OF A VEHICLE

(71) Applicants: HYUNDAI MOTOR COMPANY, Seoul (KR); KIA CORPORATION, Seoul (KR)

(72) Inventors: Kyung Sang Yu, Uijeongbu-si (KR); Je Pil Joung, Gwangmyeong-si (KR); Jun Young Lim, Incheon (KR); Won Jung Song, Seoul (KR); Sung Bae Bang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 368 days.

(21) Appl. No.: 17/985,985

(22) Filed: Nov. 14, 2022

(65) Prior Publication Data

US 2023/0249583 A1    Aug. 10, 2023

(30) Foreign Application Priority Data

Feb. 4, 2022    (KR) .......................... 10-2022-0014927

(51) Int. Cl.
*B60K 1/04*    (2019.01)
*B60L 50/60*    (2019.01)
(Continued)

(52) U.S. Cl.
CPC ................ *B60L 58/26* (2019.02); *B60K 1/04* (2013.01); *B60L 50/66* (2019.02);
(Continued)

(58) Field of Classification Search
CPC ............. H01M 10/625; H01M 10/482; H01M 10/486; H01M 10/63; H01M 10/6551; H01M 50/209; H01M 50/249
See application file for complete search history.

(56) References Cited

U.S. PATENT DOCUMENTS 5,490,572 A    2/1996    Tajiri et al.
8,701,811 B2 *    4/2014    Robinson ............... B60K 11/06
                                                        180/68.5
(Continued)

FOREIGN PATENT DOCUMENTS

JP    H05262144 A    10/1993
JP    H08310256 A    11/1996
(Continued)

OTHER PUBLICATIONS

Office Action cited in corresponding Korean application No. 10-2022-0014927; Dec. 17, 2023; 14 pp.
(Continued)

*Primary Examiner* — Jason D Shanske
*Assistant Examiner* — James J Triggs
(74) *Attorney, Agent, or Firm* — Lempia Summerfield Katz LLC

(57) ABSTRACT

Disclosed is a structure for cooling a battery of a vehicle. In particular, the structure includes: a battery case configured to accommodate a battery and mounted underneath a vehicle body floor, a longitudinal vehicle body member elongated in a front-rear direction of a vehicle body and configured to form an air passage through which air discharged from the battery case flows into a trunk, and a connection duct installed to supply the air discharged from the battery case to the air passage formed by the longitudinal vehicle body member.

11 Claims, 5 Drawing Sheets

(51) Int. Cl.
*B60L 58/26* (2019.01)
*H01M 10/613* (2014.01)
*H01M 10/625* (2014.01)
*H01M 10/6563* (2014.01)
*H01M 50/249* (2021.01)
*H01M 50/358* (2021.01)

(52) U.S. Cl.
CPC ....... *H01M 10/613* (2015.04); *H01M 10/625* (2015.04); *H01M 10/6563* (2015.04); *H01M 50/249* (2021.01); *H01M 50/358* (2021.01); *B60K 2001/0438* (2013.01); *H01M 2220/20* (2013.01)

(56) References Cited

U.S. PATENT DOCUMENTS

| | | | | |
|---|---|---|---|---|
| 8,960,350 | B2* | 2/2015 | Kosaki | H01M 10/44 180/68.5 |
| 2012/0003910 | A1 | 1/2012 | Richter | |
| 2012/0138260 | A1 | 6/2012 | Lee | |
| 2012/0312610 | A1* | 12/2012 | Kim | H01M 10/625 180/65.31 |
| 2017/0267059 | A1 | 9/2017 | Koyama et al. | |
| 2017/0341482 | A1 | 11/2017 | Takezawa | |
| 2020/0231035 | A1 | 7/2020 | Crist et al. | |
| 2021/0050573 | A1 | 2/2021 | Lee | |
| 2021/0229521 | A1 | 7/2021 | Kataoka et al. | |

FOREIGN PATENT DOCUMENTS

| | | |
|---|---|---|
| JP | 2005306239 A | 11/2005 |
| JP | 2013173469 A | 9/2013 |
| JP | 2021115950 A | 8/2021 |
| JP | 2022014936 A | 1/2022 |
| KR | 101180954 B1 | 9/2012 |
| KR | 101760446 B1 | 7/2017 |
| KR | 20200107214 A | 9/2020 |

OTHER PUBLICATIONS

Office Action cited in corresponding Korean application No. 10-2022-0014927; Oct. 11, 2023; 12 pp.

* cited by examiner

STRUCTURE FOR COOLING A BATTERY OF A VEHICLE

CROSS-REFERENCE TO RELATED APPLICATION

This application claims the priority to and the benefit of Korean Patent Application No. 10-2022-0014927, filed on Feb. 4, 2022, in the Korean Intellectual Property Office, the disclosure of which is incorporated herein by reference.

BACKGROUND

1. Field

The present disclosure relates to a structure for cooling a battery of a vehicle.

2. Description of the Related Art

A hybrid vehicle or an electric vehicle is equipped with a high-voltage battery (hereinafter simply referred to as a "battery").

Since the battery occupies a considerable volume when installed in the interior of the vehicle, the remaining interior space or trunk space in the vehicle is reduced, thereby degrading the marketability of the vehicle.

For this reason, the battery may be mounted on the outside of the vehicle so as to prevent such a reduction in interior space or trunk space in the vehicle.

Meanwhile, recently, in order to use the vehicle more easily for camping, etc., securing indoor space for a second-row seat in a recreational vehicle (RV) has become a top priority, and thus in many cases it is advantageous to mount the battery in the space below a first-row seat of the vehicle when mounting the battery on the outside of the vehicle as described above.

In addition, a battery needs to be cooled. When cooling the battery using air, air must be introduced into a battery case that houses the battery so as to cool the battery, and must then be discharged. Therefore, a suction port and a suction duct, configured to suck air for cooling the battery, and an exhaust port and an exhaust duct, configured to discharge air used to cool the battery, must be connected to the battery case.

However, since moisture must not enter the battery, the suction duct and the exhaust duct are configured not to communicate directly with the outside of the vehicle body, but to communicate with the interior of the vehicle. In this case, the air discharged from the exhaust duct after cooling the battery may undesirably subject the passengers in the vehicle to excess heat, thereby deteriorating the marketability of the vehicle.

The information disclosed in this Background of the Present disclosure section is only for enhancement of understanding of the general background of the present disclosure, and should not be taken as an acknowledgement or any form of suggestion that this information forms the related art already known to a person having ordinary skill in the art.

SUMMARY

The present disclosure provides a structure for cooling a battery of a vehicle capable not only of preventing moisture from entering a battery provided in the vehicle, but also of preventing passenger discomfort due to the heat or the like caused by the discharge of air used to cool the battery, thereby improving the marketability of the vehicle.

In an embodiment of the present disclosure, a structure for cooling a battery of a vehicle includes: a battery case configured to accommodate a battery and mounted underneath a vehicle body floor, a longitudinal vehicle body member forming an air passage, through which air discharged from the battery case flows into a trunk. In particular, the longitudinal vehicle body member is elongated in a front-rear direction of a vehicle body. The structure further includes a connection duct installed to supply the air discharged from the battery case to the air passage formed by the longitudinal vehicle body member.

The battery case may be installed under a first-row seat of the vehicle, and may be provided with a suction port communicating with an interior of the vehicle so as to cool the battery using air sucked from the suction port.

The longitudinal vehicle body member may be coupled to the lower side of the vehicle body floor so as to secure the rigidity of the vehicle body and to form the air passage together with the vehicle body floor.

The vehicle body floor may be formed with an inlet configured to connect the connection duct to the air passage.

The battery case may have an exhaust port communicating with the interior of the vehicle, and the connection duct may be installed in the interior of the vehicle and have one end connected to the exhaust port of the battery case and the other end connected to an inlet of the vehicle body floor.

The longitudinal vehicle body member may be formed with an inlet configured to connect the connection duct to the air passage.

The battery case may have an exhaust port configured to discharge air that has been used to cool the battery, and the connection duct may be installed outside the vehicle. In particular, the connection duct may have one end connected to the exhaust port of the battery case and the other end connected to the inlet of the longitudinal vehicle body member.

The trunk may have an outlet connected to the air passage.

The connection duct may be provided, at opposite ends thereof, with sealing members configured to block entry of moisture.

The longitudinal vehicle body member may have a U-shaped cross-section having flanges protruding outwards at opposite upper ends thereof, and the flanges may be coupled to a lower surface of the vehicle body floor so as to form the air passage.

The vehicle body floor and the longitudinal vehicle body member may form the air passage having a watertight structure.

The air passage may be formed by any one of two longitudinal vehicle body members. In particular, the two longitudinal vehicle body members are arranged symmetrically on opposite sides of the vehicle with respect to a front-rear center line of the vehicle, to which the connection duct is connected.

The structure further includes a lateral vehicle body member connecting the two longitudinal vehicle body members.

In one embodiment, the lateral vehicle body member may close the front end of the longitudinal members, seal the end of the air passage formed by one of the longitudinal vehicle body members.

BRIEF DESCRIPTION OF THE DRAWINGS

The above and other objects, features, and other advantages of the present disclosure should be more clearly understood from the following detailed description taken in conjunction with the accompanying drawings, in which.

Figure 1:
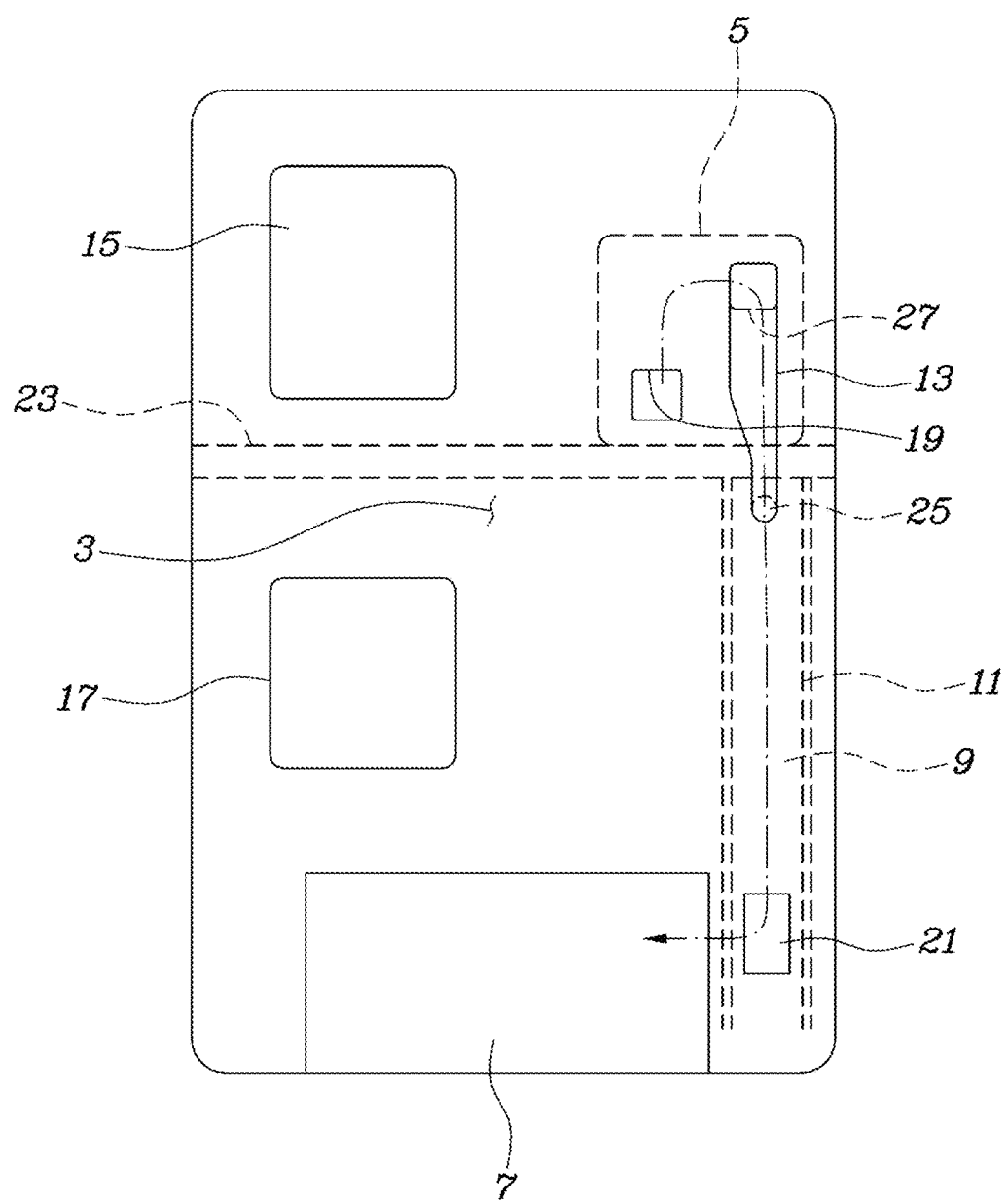
FIG. 1 is a view depicting a structure for cooling a battery of a vehicle according to one embodiment of the present disclosure.

The drawings described herein are for illustration purposes only and are not intended to limit the scope of the present disclosure in any way.

DETAILED DESCRIPTION

Various exemplary embodiments are now described more fully with reference to the accompanying drawings, which show only some exemplary embodiments. Specific structural and functional details disclosed herein are merely representative for the purpose of describing exemplary embodiments. The present disclosure, however, may be embodied in many alternative forms, and should not be construed as being limited to the exemplary embodiments set forth herein.

Accordingly, while exemplary embodiments of the present disclosure are capable of being variously modified and taking alternative forms, embodiments thereof are shown by way of example in the drawings, and are described herein in detail. It should be understood, however, that there is no intent to limit the present disclosure to the particular exemplary embodiments disclosed herein. On the contrary, exemplary embodiments are to cover all modifications, equivalents, and alternatives falling within the scope of the present disclosure.

It should be understood that, although the terms "first", "second", etc. may be used herein to describe various elements, these elements should not be limited by these terms. These terms are only used to distinguish one element from another. For example, a first element could be termed a second element, and similarly, a second element could be termed a first element, without departing from the scope of exemplary embodiments of the present disclosure.

When a component, device, element, or the like of the present disclosure is described as having a purpose or performing an operation, function, or the like, the component, device, or element should be considered herein as being "configured to" meet that purpose or to perform that operation or function.

It should be understood that when an element is referred to as being "connected to" another element, the element can be directly connected to the other element, or intervening elements may also be present. In contrast, when an element is referred to as being "directly connected to" another element, there are no intervening elements present. Other words used to describe the relationships between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the present disclosure. As used herein, the singular forms "a", "an", and "the" are intended to include the plural forms as well, unless the context clearly indicates otherwise. It should be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, including technical or scientific terms, have the same meanings as those generally appreciated by those having ordinary skill in the art. Terms defined in common dictionaries should be interpreted as having the same meanings as terms in the context of the pertinent technology, and should not be interpreted as having ideal or excessively formal meanings unless clearly defined in the specification.

A description is now given in detail of embodiments disclosed herein with reference to the accompanying drawings. Like reference numerals in each drawing indicate like members.

Referring to FIGS. 1 to 5, a structure for cooling a battery of a vehicle according to embodiments of the present disclosure includes a battery case 5 configured to accommodate a battery 1 and mounted underneath a vehicle body floor 3. The structure further includes a longitudinal vehicle body member 11 forming an air passage 9 through which air discharged from the battery case 5 flows into a trunk 7, and the longitudinal vehicle body member 11 is elongated in a front-rear direction of the vehicle body. The structure further includes a connection duct 13 installed to supply the air discharged from the battery case 5 to the air passage 9, and the connection duct 13 is formed by the longitudinal vehicle body member 11.

In other words, in the present disclosure, the battery case 5 accommodating the battery 1 is installed underneath the vehicle body floor 3 on the outside of the vehicle so as to allow the air that has been used to cool the battery 1 to be discharged into the trunk 7 space through the air passage 9. The air passage 9 is formed by the connection duct 13 and the longitudinal vehicle body member 11, while simultaneously conferring an advantage of securing interior space in the vehicle. This structure not only prevents moisture from permeating into the battery case 5, but also prevents passenger discomfort due to, for example, the heat from the air discharged from the battery case 5, thereby greatly improving the marketability of the vehicle.

In these embodiments, the battery case 5 is installed under a first-row seat 15 of the vehicle. This increases the efficiency of use of indoor space in the area where a second-row seat 17 is installed.

The battery case 5 is provided with a suction port 19 communicating with the interior of the vehicle so as to cool the battery 1 using air sucked from the suction port 19.

Therefore, although the battery case 5 is installed underneath the vehicle body floor 3 on the outside of the vehicle, the battery case 5 is configured to suck air for cooling the battery 1 from inside the vehicle, cool the battery 1, and then discharge the air to the trunk 7 space as described above so that the possibility of moisture entering through the air inlet/outlet for cooling the battery 1 is eliminated.

To this end, an outlet 21 connected to the air passage 9 is formed in the trunk 7. The outlet 21 is formed to communicate with the space in the trunk 7. Thus the air discharged to the outlet 21 through the air passage 9 is introduced into the trunk 7. Here, since the trunk 7 has a structure in which external moisture does not permeate into the space in the trunk 7, moisture is not introduced into the battery 1 through the air passage 9.

In addition, the trunk 7 space is separated from the interior space where passengers are present or is far therefrom, so that the passengers do not feel discomfort due to, for example, the heat from the air discharged into the trunk 7 space as described above.

The longitudinal vehicle body member 11 is coupled to the lower side of the vehicle body floor 3 so as to secure the rigidity of the vehicle body and to form the air passage 9 together with the vehicle body floor 3.

The longitudinal vehicle body members 11 are disposed symmetrically on opposite sides of the vehicle with respect to the front-rear center line of the vehicle. The air passage 9 is formed by any one of the two longitudinal vehicle body members 11 to which the connection duct 13 is connected.

In other words, in the present disclosure, the longitudinal vehicle body member 11, which is already used for securing the rigidity of the vehicle, is additionally utilized to form the air passage 9 without a separate duct part so as to deliver the air discharged from the battery case 5 to the trunk 7 space. In other words, one of the two longitudinal vehicle body members 11 serves the function of forming the air passage 9, in addition to the original function of securing the rigidity of the vehicle body.

FIG. 1 illustrates a view of the vehicle body floor 3 seen from above (i.e., a plan view). Here, the first-row seat 15 and the second-row seat 17 are disposed not only on the left side but also on the right side of the vehicle, but for the sake of clarity of explanation of the present disclosure, the seats on the right side are not shown, and for the same reason, the longitudinal vehicle body member 11 disposed on the left side is omitted in the drawing.

In addition, although a lateral vehicle body member 23 is illustrated to be disposed in front of the longitudinal vehicle body member 11 in FIG. 1, the longitudinal vehicle body member 11 may extend further forwards beyond the lateral vehicle body member 23, and the lateral vehicle body member 23 may be omitted or disposed at another position.

A vehicle having a monocoque structure may include longitudinal vehicle body members on both left and right sides and lateral vehicle body members connecting these longitudinal vehicle body members.

In this embodiment, a lateral vehicle body member 23 connects the two longitudinal vehicle body members 11, and the lateral vehicle body member 23 closes the front end of the longitudinal vehicle body members 11, sealing the end of the air passage 9 formed by one of the longitudinal vehicle body members 11.

The arrow in FIG. 1 indicates that the flow of the air sucked in from the suction port 19 of the battery case 5. The air cools the battery 1 and is discharged to the outlet 21 through the connection duct 13 and the air passage 9, and is then discharged into the trunk space.

Figure 2:
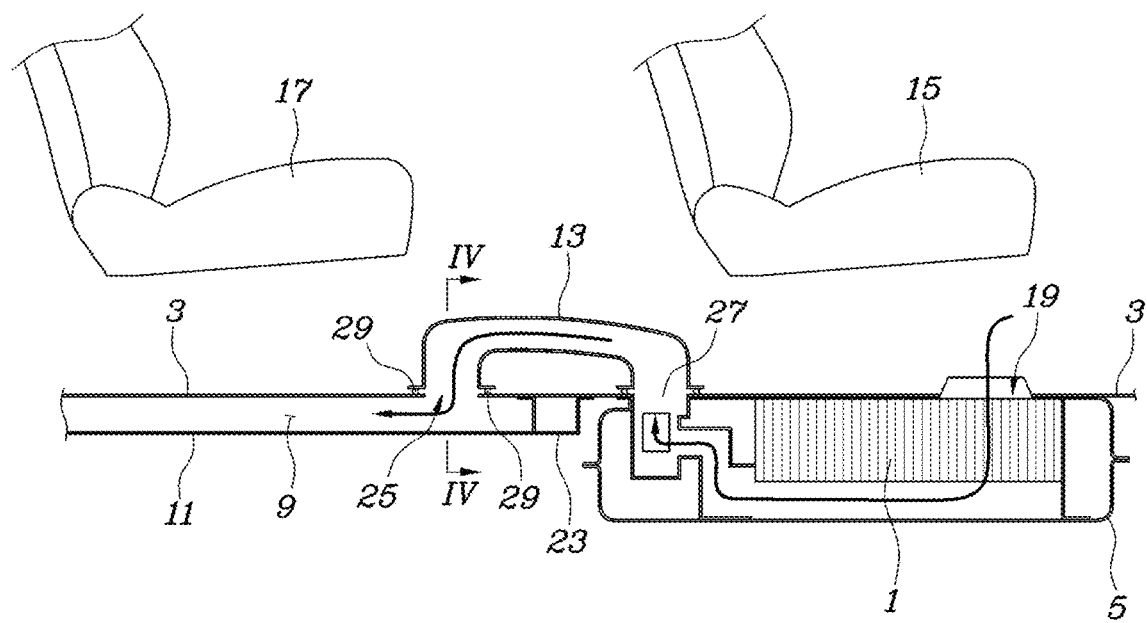
FIG. 2 is a cross-sectional view taken along line II-II of FIG. 1.
Figure 4:
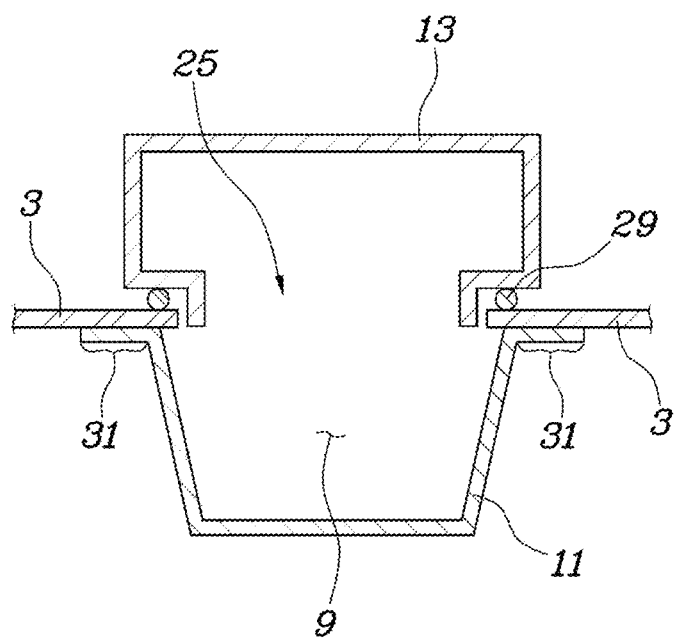
FIG. 4 is a cross-sectional view taken along line IV-IV of FIG. 2.

For reference, the positions of the suction port 19 and an exhaust port 27 in the battery case 5 in FIGS. 2 and 4 are indicated independently of FIG. 1 for convenience of understanding, and the arrows indicate the flow of the air.

Figure 3:
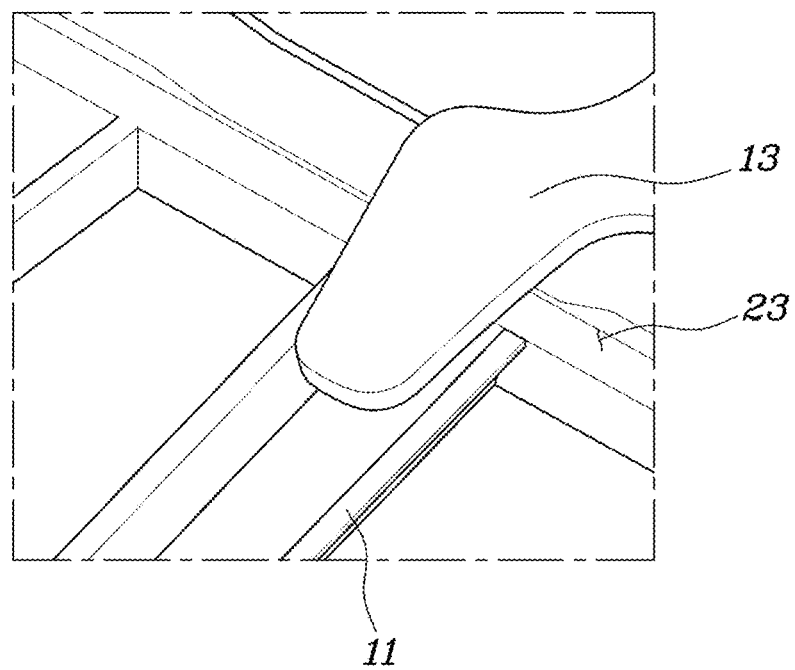
FIG. 3 is a view for explaining region III of FIG. 1.

In addition, in FIG. 3, the vehicle body floor 3 is omitted, but the connection duct 13 and the longitudinal vehicle body member 11 are shown.

The above is common to the embodiments of the present disclosure, and in the embodiments of FIGS. 1 to 4, the vehicle body floor 3 has an inlet 25 configured to connect the connection duct 13 to the air passage 9.

In other words, the battery case 5 has the exhaust port 27 communicating with the interior of the vehicle, and the connection duct 13 is installed in the interior of the vehicle and has one end connected to the exhaust port 27 of the battery case 5 and another end connected to the inlet 25 of the vehicle body floor 3.

The connection between the connection duct 13 and the exhaust port 27 of the battery case 5 may be achieved in a manner such that the exhaust port 27 of the battery case 5 is directly connected to the lower side of the vehicle body floor 3 and the connection duct 13 is connected to the upper side of the vehicle body floor 3, as illustrated in FIG. 2, such that a separate exhaust duct is provided between the exhaust port 27 of the battery case 5 and the vehicle body floor 3, or such that a separate duct structure is interposed between the upper surface of the vehicle body floor 3 and the connection duct 13.

Figure 5:
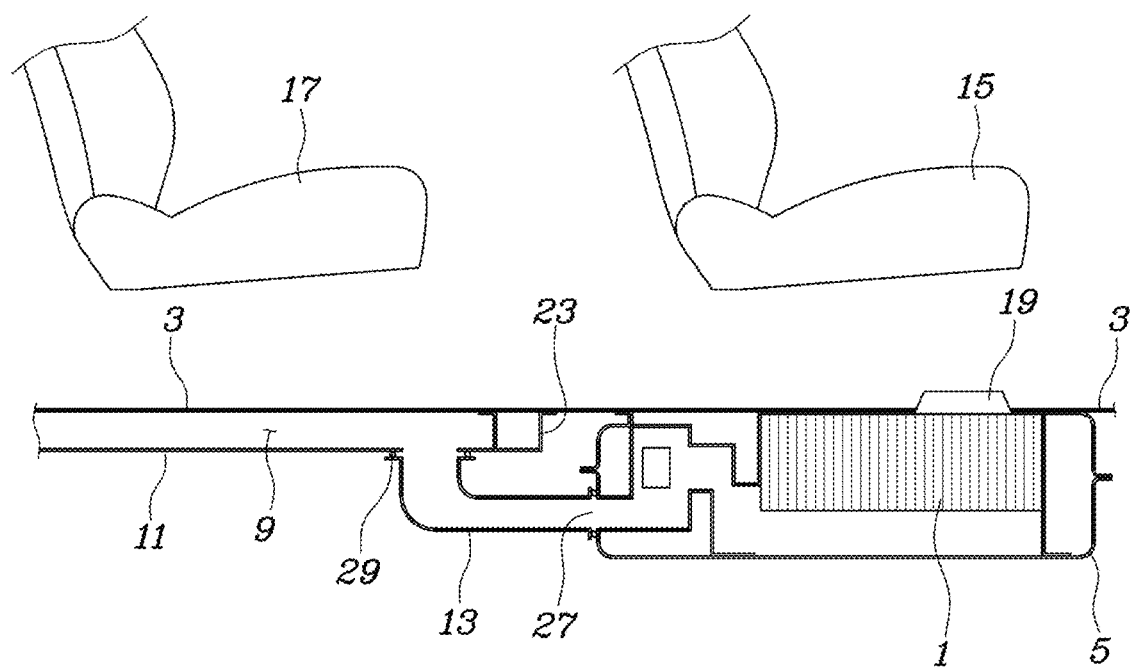
FIG. 5 is a view illustrating another embodiment of the present disclosure.

Here, the difference from the embodiment of FIG. 5 is that the connection duct 13 is disposed inside the vehicle. Accordingly, the inlet 25 is formed in the vehicle body floor 3 so as to connect the connection duct 13 to the air passage 9.

Meanwhile, in the embodiment of FIG. 5, the connection duct 13 is disposed outside the vehicle so as to allow the air discharged from the battery case 5 to flow to the air passage 9 through the longitudinal vehicle body member 11.

In other words, the battery case 5 has the exhaust port 27 configured to discharge air that has been used to cool the battery 1, and the connection duct 13 is installed outside the vehicle and has one end connected to the exhaust port 27 of the battery case 5 and another end connected to the inlet 25 of the longitudinal vehicle body member 11.

Accordingly, in this embodiment, the longitudinal vehicle body member 11 has the inlet 25 configured to connect the connection duct 13 to the air passage 9.

In this case as well, the connection duct 13 may be directly connected to the exhaust port 27 of the battery case 5 as illustrated in FIG. 5, or may be connected the exhaust port 27 through an additional separate exhaust duct.

Meanwhile, in the above embodiments, sealing members 29 configured to block the entry of moisture may be installed at opposite ends of the connection duct 13, respectively, and a separate fastening mechanism, such as a bolt or clamp, which compresses a corresponding sealing member 29 so as to prevent moisture from being introduced into a gap between the connection duct 13 and a component connected thereto, may be used.

As illustrated in FIG. 4, the longitudinal vehicle body member 11 has a U-shaped cross-section having flanges 31 protruding outwards at opposite upper ends thereof, and the flanges 31 are coupled to the lower surface of the vehicle body floor 3 so as to form the air passage 9.

Because the vehicle body floor 3 and the longitudinal vehicle body member 11 form an air passage 9 having a watertight structure, the flange 31 of the longitudinal vehicle body member 11 is coupled to the lower side of the vehicle body floor 3 in a manner that enables a seal to be realized, such as welding.

In addition, when a hole or a gap is created in some part of the vehicle body floor 3 or the longitudinal vehicle body member 11, which are forming the air passage 9, for a reason such as mounting of a separate component, the affected area may be sealed using a sealer or the like.

As is apparent from the above description, the present disclosure provides a structure for cooling a battery of a vehicle capable not only of preventing moisture from entering a battery provided in the vehicle, but also of preventing passenger discomfort due to heat or the like caused by discharge of air that has been used to cool the battery, thereby improving the marketability of the vehicle.

Although the embodiments of the present disclosure have been disclosed for illustrative purposes, those having ordinary skill in the art should appreciate that various modifications, additions, and substitutions are possible, without departing from the scope and spirit of the present disclosure.

What is claimed is:

1. A structure for cooling a battery of a vehicle, the structure comprising:
    a battery case configured to accommodate a battery and mounted underneath a vehicle body floor;
    a lateral vehicle body member extending along a transverse direction of a vehicle body at a rear of the battery case;
    a longitudinal vehicle body member with a front end sealed by the lateral vehicle body member,
        wherein the longitudinal vehicle body member is configured to form an air passage through which air discharged from the battery case flows into a trunk and further configured to be elongated in a straight line in a front-rear direction of the vehicle body; and
    a connection duct formed by the longitudinal vehicle body member and configured to supply the air discharged from the battery case to the air passage,
    wherein the longitudinal vehicle body member is coupled to a lower side of the vehicle body floor so as to secure rigidity of the vehicle body and to form the air passage together with the vehicle body floor.

2. The structure according to claim 1, wherein the battery case is installed under a first-row seat of the vehicle and provided with a suction port configured to communicate with an interior of the vehicle so as to cool the battery using air sucked from the suction port.

3. The structure according to claim 1, wherein the vehicle body floor is formed with an inlet configured to connect the connection duct to the air passage.

4. The structure according to claim 1, wherein:
    the battery case has an exhaust port configured to communicate with an interior of the vehicle, and
    the connection duct is installed in the interior of the vehicle and includes: a first end connected to the exhaust port of the battery case and a second end connected to an inlet of the vehicle body floor.

5. The structure according to claim 1, wherein the longitudinal vehicle body member is formed with an inlet configured to connect the connection duct to the air passage.

6. The structure according to claim 5, wherein:
    the battery case has an exhaust port configured to discharge air that has been used to cool the battery, and
    the connection duct is installed outside the vehicle and includes: a first end connected to the exhaust port of the battery case and a second end connected to the inlet of the longitudinal vehicle body member.

7. The structure according to claim 1, wherein the trunk includes an outlet connected to the air passage.

8. The structure according to claim 1, wherein the connection duct is provided, at opposite ends thereof, with sealing members configured to block entry of moisture.

9. The structure according to claim 1, wherein the longitudinal vehicle body member has a U-shaped cross-section having flanges protruding outwards at opposite upper ends thereof, and the flanges are coupled to a lower surface of the vehicle body floor so as to form the air passage.

10. The structure according to claim 1, wherein the vehicle body floor and the longitudinal vehicle body member form the air passage having a watertight structure.

11. The structure according to claim 1, wherein the air passage is formed by any one of two longitudinal vehicle body members, the two longitudinal vehicle body members being arranged symmetrically on opposite sides of the vehicle with respect to a front-rear center line of the vehicle, to which the connection duct is connected.

* * * * *